United States Patent
Manoj et al.

(10) Patent No.: US 8,347,304 B2
(45) Date of Patent: Jan. 1, 2013

(54) RESOURCE ALLOCATION FAILURE RECOVERY MODULE OF A DISK DRIVER

(75) Inventors: Jose K. Manoj, Lilburn, GA (US); Chennakesava R. Arnoori, Atlanta, GA (US); Atul Mukker, Suwanee, GA (US)

(73) Assignee: LSI Corporation, Milpitas, CA (US)

( * ) Notice: Subject to any disclaimer, the term of this patent is extended or adjusted under 35 U.S.C. 154(b) by 981 days.

(21) Appl. No.: 12/393,312

(22) Filed: Feb. 26, 2009

(65) Prior Publication Data
US 2010/0218193 A1    Aug. 26, 2010

(51) Int. Cl.
*G06F 9/50* (2006.01)
(52) U.S. Cl. ...................................................... 718/104
(58) Field of Classification Search .................... 718/104
See application file for complete search history.

(56) References Cited

U.S. PATENT DOCUMENTS

| | | | |
|---|---|---|---|
| 5,386,551 A * | 1/1995 | Chikira et al. .................. 714/46 |
| 5,845,082 A * | 12/1998 | Murakami ..................... 709/226 |
| 6,047,323 A * | 4/2000 | Krause .......................... 709/227 |
| 6,385,715 B1 * | 5/2002 | Merchant et al. ............. 712/219 |
| 6,792,446 B2 * | 9/2004 | Merchant et al. ............. 718/108 |
| 7,051,329 B1 * | 5/2006 | Boggs et al. .................. 718/104 |
| 7,200,737 B1 * | 4/2007 | Merchant et al. ............. 712/218 |
| 7,451,295 B2 * | 11/2008 | Kuttanna et al. .............. 712/216 |
| 7,743,209 B2 * | 6/2010 | Takada et al. ................. 711/113 |
| 7,814,292 B2 * | 10/2010 | Tsien ............................ 711/202 |
| 8,069,191 B2 * | 11/2011 | Revah et al. .................. 707/812 |
| 8,091,088 B2 * | 1/2012 | Kishan et al. ................. 718/104 |
| 2004/0244001 A1 * | 12/2004 | Haller et al. .................. 718/100 |
| 2005/0166206 A1 * | 7/2005 | Parson .......................... 718/104 |
| 2006/0190482 A1 * | 8/2006 | Kishan et al. ............. 707/103 Y |
| 2009/0019251 A1 * | 1/2009 | Helman et al. ............... 711/171 |
| 2009/0059850 A1 * | 3/2009 | Jung et al. .................... 370/329 |

OTHER PUBLICATIONS

Free On-Line Dictionary of Computing © 1995, search term: "RAID" www.foldoc.org.*

* cited by examiner

*Primary Examiner* — Aimee Li
(74) *Attorney, Agent, or Firm* — Christopher P. Maiorana, PC

(57) ABSTRACT

A method of resource allocation failure recovery is disclosed. The method generally includes steps (A) to (E). Step (A) may generate a plurality of resource requests from a plurality of driver modules to a manager module executed by a processor. Step (B) may generate a plurality of first calls from the manager module to a plurality of allocation modules in response to the resource requests. Step (C) may allocate a plurality of resources to the driver modules using the allocation modules in response to the first calls. Step (D) may allocate a portion of a memory pool to a particular recovery packet using the manager module in response to the allocation modules signaling a failed allocation of a particular one of the resources. Step (E) may recover from the failed allocation using the particular recovery packet.

20 Claims, 7 Drawing Sheets

RESOURCE ALLOCATION FAILURE RECOVERY MODULE OF A DISK DRIVER

FIELD OF THE INVENTION

The present invention relates to storage device software drivers generally and, more particularly, to a method and/or apparatus for implementing a resource allocation failure recovery module of a disk driver.

BACKGROUND OF THE INVENTION

A conventional software driver module for a Redundant Array of Independent Disks (RAID) system allocates resources, such as Hardware Abstraction Layer (HAL) packets, RAID Core Layer (RCL) packets and dynamic memory, in performing different tasks. Requests to allocate the resources can fail if a provided memory pool is insufficient. The resource allocation requests can be initiated by any submodule in the driver module. Each resource failure can result in a resource failure recovery handling routine being performed by many different modules.

Referring to FIG. 1, a diagram of a module layering of a conventional software RAID driver 10 is shown. The software RAID driver 10 illustrated has three layers and each layer has multiple recovery modules. Each resource failure is handled separately within each layer. As a result, recovery from a single failure can be repeated several times across the various layers. Furthermore, no mechanism is in place to throttle back other commands to give time for recovery from the failed commands. Some complexities involved in the above layered approach often lead software driver developers to allocate excessive numbers of resources and expect the resource allocations not to fail. As a result, the possibility of increasing outstanding commands or performance is commonly reduced. The resulting drivers are not able to configure dynamically to achieve a maximum throughput.

SUMMARY OF THE INVENTION

The present invention concerns a method of resource allocation failure recovery. The method generally includes steps (A) to (E). Step (A) may generate a plurality of resource requests from a plurality of driver modules to a manager module executed by a processor. Step (B) may generate a plurality of first calls from the manager module to a plurality of allocation modules in response to the resource requests. Step (C) may allocate a plurality of resources to the driver modules using the allocation modules in response to the first calls. Step (D) may allocate a portion of a memory pool to a particular recovery packet using the manager module in response to the allocation modules signaling a failed allocation of a particular one of the resources. Step (E) may recover from the failed allocation using the particular recovery packet.

The objects, features and advantages of the present invention include providing a method and/or apparatus for implementing a resource allocation failure recovery module of a disk driver that may (i) be simple to implement, (ii) handle all resource allocation failures, (iii) consume little memory, (iv) operate independently of other modules, (v) be easily merged with other modules, (vi) reduce an overall resource usage in a disk driver or application and/or (vii) be easily ported into any application.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Embodiments of the present invention generally concern a method and/or apparatus in which resource recovery tasks may be combined into a single resource recovery manager module of a disk driver. The disk driver generally controls a Redundant Array of Independent Disks (RAID) device or system. Other memory drivers may be implemented to meet the criteria of a particular application. Resources that may be allocated generally include, but are not limited to, Hardware Abstraction Layer (HAL) packets, RAID Core Layer (RCL) packets, memory resources, communication resources, processing resources, and the like.

A data structure may be defined to hold (i) caller function arguments and (ii) pointers to other functions to be called. Furthermore, the resource recovery manager module may take ownership of any function requests or other driver module requests for access to the various resources available to the disk driver. As such, implementation of separate resource failure recovery callback functions for each possible resource requesting module may be avoided. The resulting disk driver may resolve different resource allocation failures with the help of the single resource recovery management module.

Recovery packets (e.g., REC_PACKET_T) may be created to support recovery of resource allocation failures, a single packet REC_PACKET_T for each respective failure. A size of each REC_PACKET_T may be smaller than a HAL packet, an RCL packet and most of other resource allocation code sizes. The small code size generally allows recovery packets to be created for each possible resource allocation failure case.

The RCL packets may provide communications between an RCL layer and an operating system layer. The RCL layer generally translates operating system commands into commands understandable by a HAL layer. The HAL packets generally provide communications between the RCL layer and the HAL layer of the disk driver. The HAL layer may be disk device specific and may perform the actual input/output operations to and from the physical disks of a RAID device.

Figure 1:
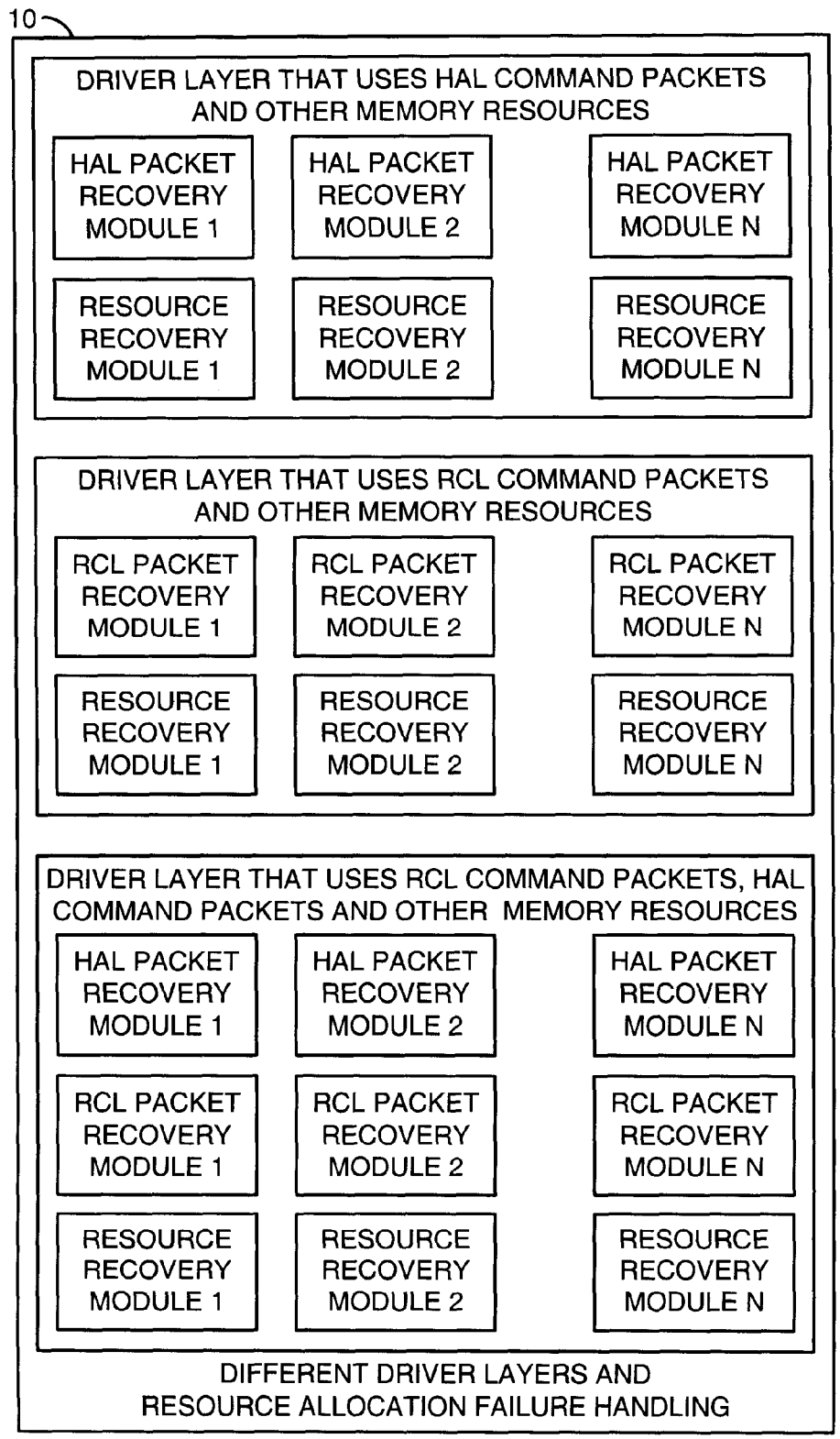
FIG. 1 is a diagram of a module layering of a conventional software RAID driver.
Figure 2:
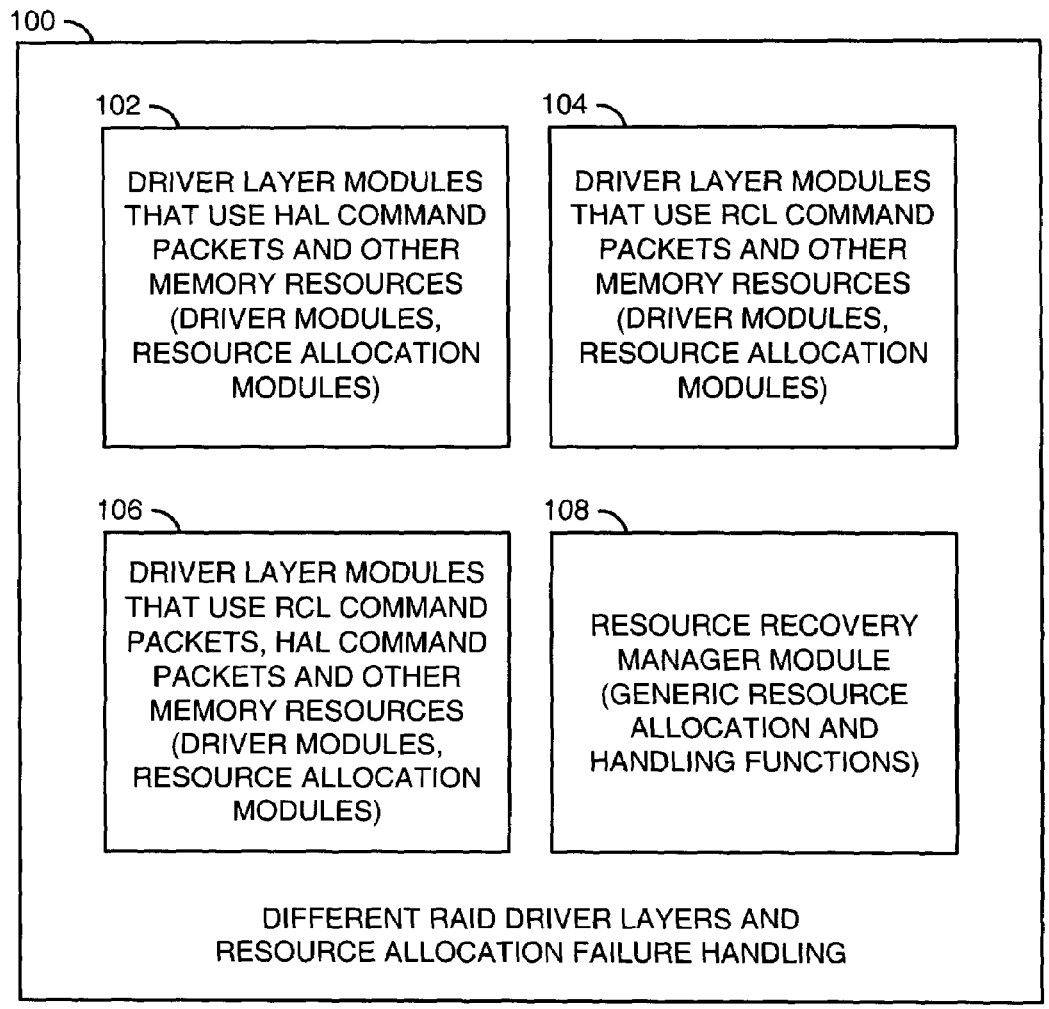
FIG. 2 is a block diagram of a module layering of a software RAID driver in accordance with a preferred embodiment of the present invention.

Referring to FIG. 2, a block diagram of a module layering of a software RAID driver 100 is shown in accordance with a preferred embodiment of the present invention. The driver 100 generally comprises a layer 102, a layer 104, a layer 106 and a module 108. Each of the layers 102 to 106 may represent multiple modules, functions, programs and/or blocks that may be implemented as software, firmware, a combination of software and firmware, or other implementations. The module 108 may represent a program, function and/or block that may be implemented as software, firmware, a combination of software and firmware, or other implementations.

The layer 102 may be implemented as a first disk driver layer that uses HAL command packets and other memory resources. The layer 102 may be operational as a HAL layer that communicates between the layer 106 and the physical disks of the RAID device. The layer 102 generally comprises one or more disk driver modules and at least one resource allocation module associated with the layer.

The layer 104 may be implemented as a second disk driver layer that uses RCL command packets and other memory resources. The layer 104 may be operational as a translation layer that provides communications between an operating system and the layer 106. The layer 104 generally comprises one or more disk driver modules and at least one resource allocation module associated with the layer.

The layer 106 may be implemented as a third disk driver layer that uses the RCL command packets, the HAL command packets and other memory resources. The layer 106 may be implemented as an RCL layer that communicates between the layer 102 and the layer 104. The layer 106 generally comprises one or more disk driver modules and at least one resource allocation module associated with the layer.

The module 108 may be implemented as a resource recovery manager module, or manager module for short. The module 108 is generally operational to initiate generic resource allocation functions and provide resource allocation failure handing functions. An example implementation of a recovery specific structure with a callback function pointer definition may be as follows:

```
/* Recovery callback function */
typedef uint32_t (*rec_callback_t) (uint64_t ctx1, uint64_t ctx2, uint64_t ctx3);
/**
 *@struct rec_packet_t
 *
 *@brief
 * recovery packet for non-io resource recovery support. A private
structure.
 */
typedef struct _rec_packet_t {
    uint64_t pvt_context1; //!<Private context 1 provided by user
    uint64_t pvt_context2; //!<Private context 2 provided by user
    uint64_t pvt_context3; //!<Private context 3 provided by user
    rec_callback_t rec_callback_fn; //!<The function pointer to be
retried
} rec_packet_t;
```

The callback function may be defined to use several (e.g., 3) parameters. The recovery packet structure may hold all of the parameters. Resource allocation functions utilizing more parameters than as illustrated above may be achieved by increasing the number of parameters to the callback function and increasing the number of recovery packet private context variables. The structure of the packets REC_PACKET_T may also hold the callback function pointer (e.g., rec_callback_fn) to be called when retrying to allocate a resource.

Figure 3:
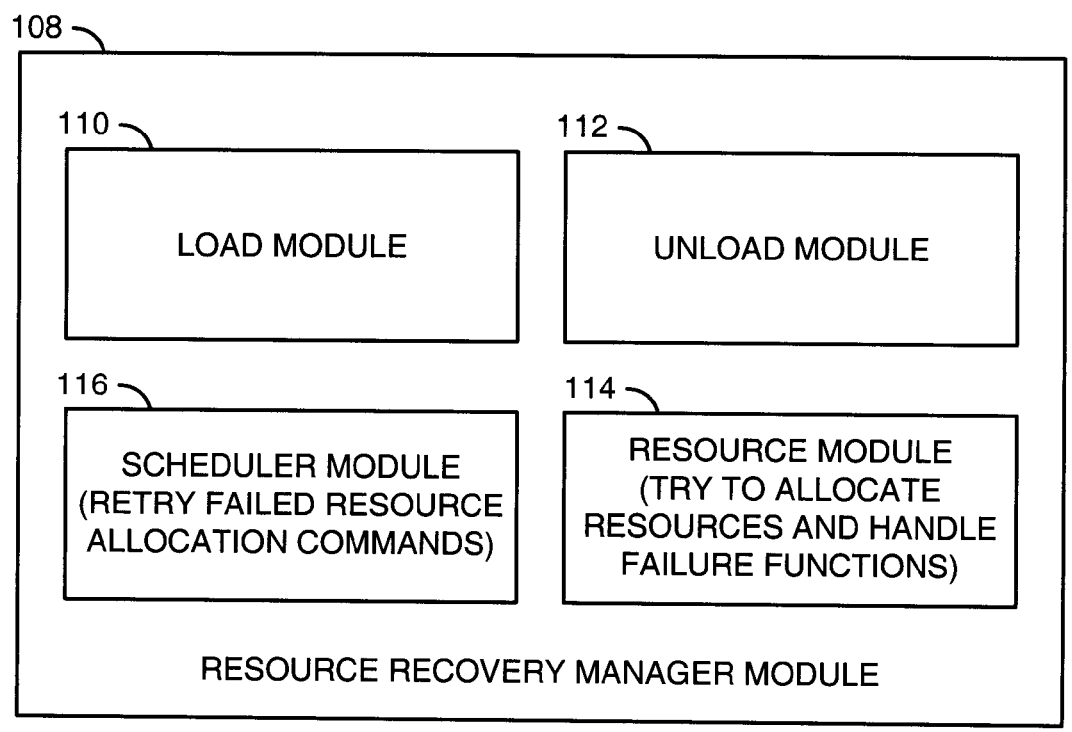
FIG. 3 is a detailed diagram of an example implementation of a resource recovery manager module.

Referring to FIG. 3, a detailed diagram of an example implementation of the module 108 is shown. The module 108 generally comprises a module 110, a module 112, a module 114 and a module 116. Each of the modules 110 to 116 may represent a program, function and/or block that may be implemented as software, firmware, a combination of software and firmware, or other implementations.

The module 110 generally implements a load module. The module 110 may be operational to allocate memory from a general memory pool to a recovery memory pool that holds the packets REC_PACKET_T. A size of an individual packet REC_PACKET_T may be small so that users of the module 108 may allocate a large number of packet REC_PACKET_T structures without concerns for exhausting the available capacity of the general memory pool. The recovery memory pool may be organized in a link list fashion.

The module 112 may implement an unload module. The module 112 may be operational to remove memory allocated to the recovery packet pool. A housekeeping operation of the module 112 may also destroy the recovery memory pool where appropriate.

The module 114 may be implemented as a resource module. The module 114 may be operational to command attempted allocations of the resources. The module 114 may also mark failed resource allocation attempts using the packets REC_PACKET_T. The module 114 may be used by all of the other modules within the module 108 and the layers 102-106.

The module 116 may be implemented as a schedule module. The module 116 is generally operational to retry failed resource allocation commands. The module 116 may schedule the retries intermixed with new pending commands such that both the recovery commands and the new pending commands may each be given a chance to perform.

Figure 4:
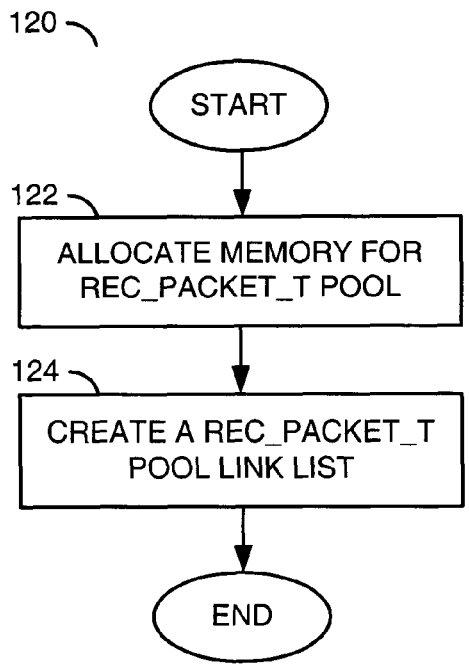
FIG. 4 is a flow diagram of an example implementation of a method to load a recovery pool.

Referring to FIG. 4, a flow diagram of an example implementation of a method 120 of a load function is shown. The method (or process) 120 may be performed by the module 110. The method 120 generally comprises a step 122 and a step 124. Each of the steps 122-124 may represent a function and/or block that may be implemented as software, firmware, a combination of software and firmware, or other implementations. In the step 122, the module 110 may allocation memory from the general memory pool to the recovery memory pool. In the step 124, the module 110 may create a link list for the recovery memory pool.

Figure 5:
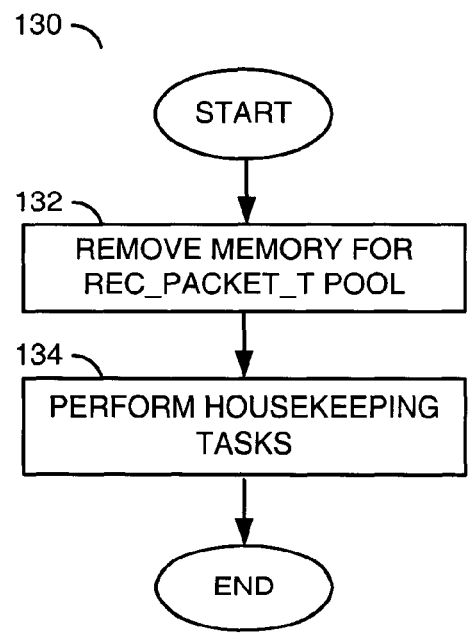
FIG. 5 is a flow diagram of an example implementation of a method to unload the recovery pool.

Referring to FIG. 5, a flow diagram of an example implementation of a method 130 of an unload function is shown. The method (or process) 130 may be performed by the module 112. The method 130 generally comprises a step 132 and a step 134. Each of the steps 132-134 may represent a function and/or block that may be implemented as software, firmware, a combination of software and firmware, or other implementations. In the step 132, the module 112 may move the recovery memory pool back to the general memory pool. In the step 134, the module 112 may perform housekeeping in response to the reallocation away from the recovery memory pool. The housekeeping tasks may include, but are not limited to, clearing out packet contents, initializing the packet list objects, adjusting a packet usage counter, and the like.

Figure 6:
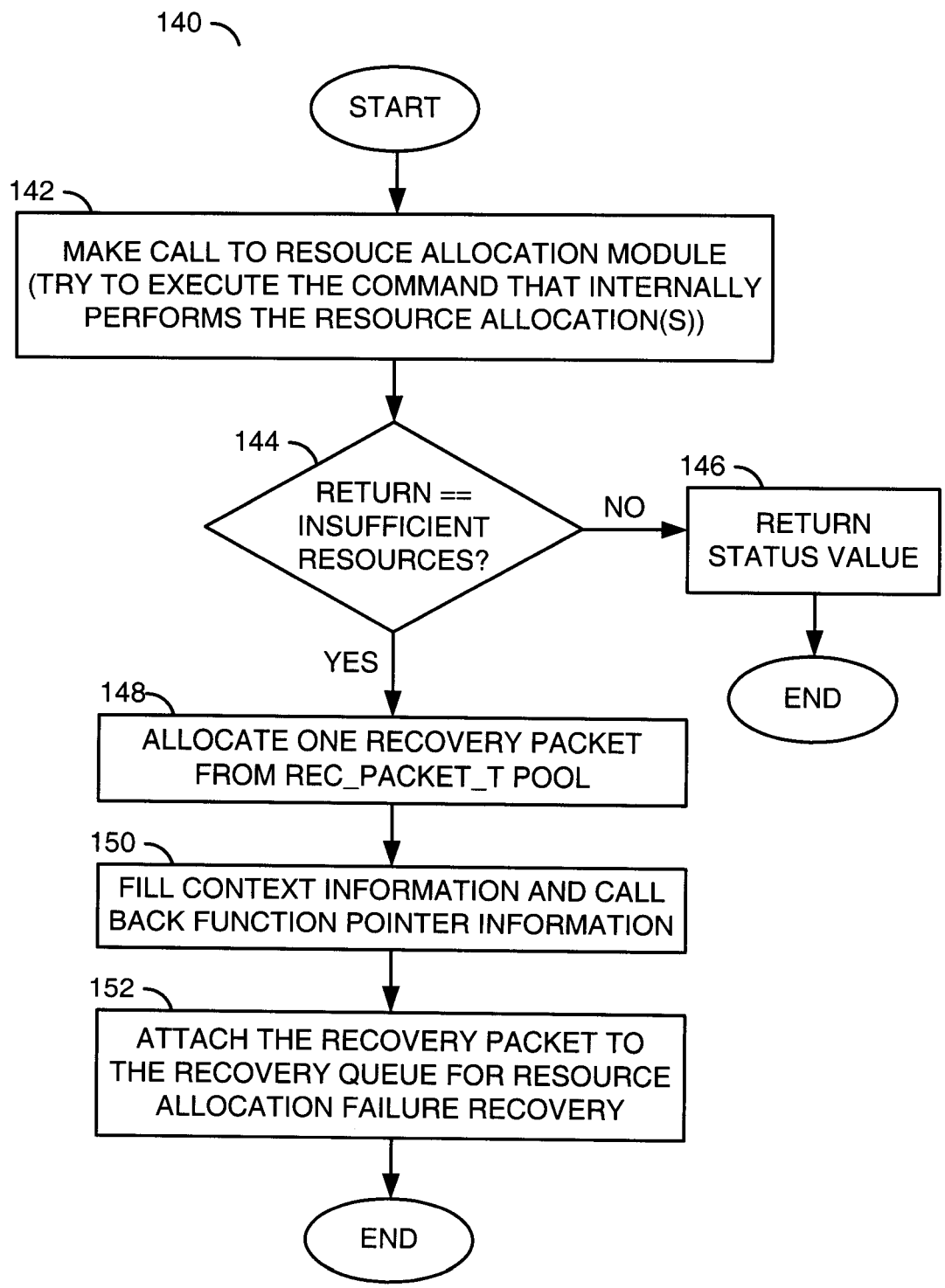
FIG. 6 is a flow diagram of an example implementation of a method to try an allocate resources function.

Referring to FIG. 6, a flow diagram of an example implementation of a method 140 to try an allocate resources function is shown. The method (or process) 140 may be performed by the module 114. The method 140 generally comprises a step 142, a step 144, a step 146, a step 148, a step 150 and a step 152. Each of the steps 142-152 may represent a function and/or block that may be implemented as software, firmware, a combination of software and firmware, or other implementations. An example functional syntax used by the module 114 may be given as follows:

uint32_t rec_mgr_try_res_alloc_and_handle_failure(rec_mgr_t *rec_mgr, rec_callback_t func_callback, uint64_t ctx1, uint64_t ctx2, uint64_t ctx3)

A first parameter of the function may be a recovery manager structure pointer (e.g., *rec_mgr) that identifies where the recovery memory pool is saved within an addressable memory space of the apparatus. A second parameter of the function may be a callback function (e.g., func_callback). The callback function may be used to initiate an allocation of a requested resource.

The module 114 is generally called in the step 142 by a requesting module (e.g., a disk driver module in one of the layers 102-106) that asks for a resource allocation. The requesting modules may call the module 114 instead of directly calling any of the resource allocation modules that actually allocate the resources. Each of the requesting module may send to the module 114 (i) a pointer to an appropriate resource allocation module to be called (e.g., func_callback) and (ii) the corresponding parameters (e.g., ctx1, ctx2, ctx3). Therefore, the requesting modules may call the module 114 and then the module 114 may call the intended resource allocation modules. Any resource allocation failures experienced by the resource allocation modules may be subsequently handled by the module 114.

If the call to the intended resource allocation module returns a resource allocation success value (e.g., the NO branch of step 144), the module 114 may return the status returned from the module called in the step 142 (e.g., request success, request not supported, request failed, etc.) to the requesting module in the step 146. If the call to the intended resource allocation module returns a resource allocation failed value (e.g., the YES branch of step 144), the failed resource allocation command may be a candidate for retry. As such, the module 114 may allocate a single packet REC_PACKET_T in the recovery memory pool in the step 148. In the step 150, the corresponding function callback pointer and associated parameters may be stored in the packet REC_PACKET_T structure. The filled packet REC_PACKET_T may then be queued in a recovery queue in the step 152 for subsequent resource allocation recovery.

Figure 7:
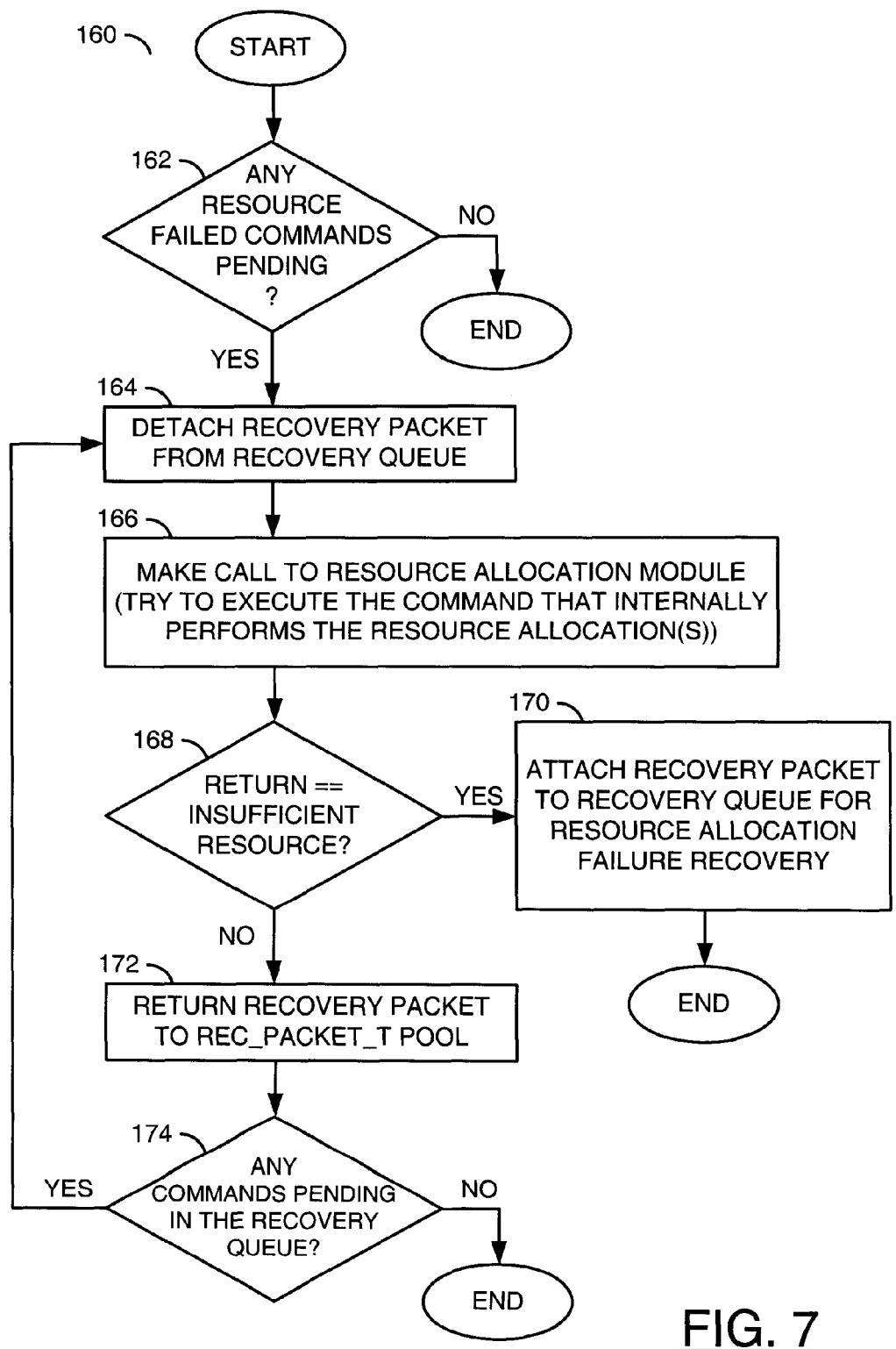
FIG. 7 is a flow diagram of an example implementation of a method to retry the allocate resources function.

Referring to FIG. 7, a flow diagram of an example implementation of a method 160 to retry the allocate resources function is shown. The method 160 (or process) may be performed by the module 116. The method 160 generally comprises a step 162, a step 164, a step 166, a step 168, a step 170, a step 172 and a step 174. Each of the steps 162-174 may represent a function and/or block that may be implemented as software, firmware, a combination of software and firmware, or other implementations. The module 116 is generally called from any of one or more (e.g., 2) input/output schedulers. The input/output schedules may throttle down the flow of commands and data processed by the driver 100 when recovery commands are pending in the recovery queue. By throttling down new commands, (i) the resources already allocated for previous commands may have an opportunity to be freed and (ii) the failed resource allocation commands may be given time to be performed.

When the module 116 is called, an initial operation performed in step 162 may check if any failed resource allocation commands are pending in the recovery queue. If no failed commands are waiting for retry (e.g., the NO branch of step 162), the module 116 may return without taking any further action.

If one or more failed resource allocation commands are in the recovery queue (e.g., the YES branch of step 162), the module 116 may detach a first (e.g., oldest) failed command from the recovery queue in the step 164. As mentioned above, (i) each of the resource failed commands generally has a separate packet REC_PACKET_T structure and (ii) each packet REC_PACKET_T may have a callback function pointer with corresponding context arguments.

Based on the information stored in the packet REC_PACKET_T, the failed allocation command may be retried in the step 166. The module 116 may initiate the retry by calling the appropriate resource allocation module identified by the call back function contained within the packet REC_PACKET_T. If the resource allocation module responds to the retry call with the failed (e.g., INSUFFICIENT_RESOURCES) return value (e.g., the YES branch of step 168), the module 116 may place the command back in the recovery queue in the step 170 and then return to the input/output scheduler. The input/output scheduler may wait for one or more of the other outstanding new commands to be completed and then call the module 116 to attempt another retry of the next failed resource allocation command in the recovery queue.

If the retried command is successfully completed (e.g., the NO branch of step 168), the corresponding packet REC_PACKET_T may be returned to the recovery pool in the step 172. In the step 174, the module 116 may check the recovery queue for any additional failed resource allocation commands. If one or more failed commands still exist in the recovery queue (e.g., the YES branch of step 174), the method 160 may return to the step 164 where the next packet REC_PACKET_T is detached from the recovery queue and subsequently processed. After the next recovery packet has been processed, the module 116 may check again for additional commands in the recovery queue. Once the recovery queue is empty (e.g., the NO branch of step 174), the module 116 may return to the input/output scheduler.

Figure 8:
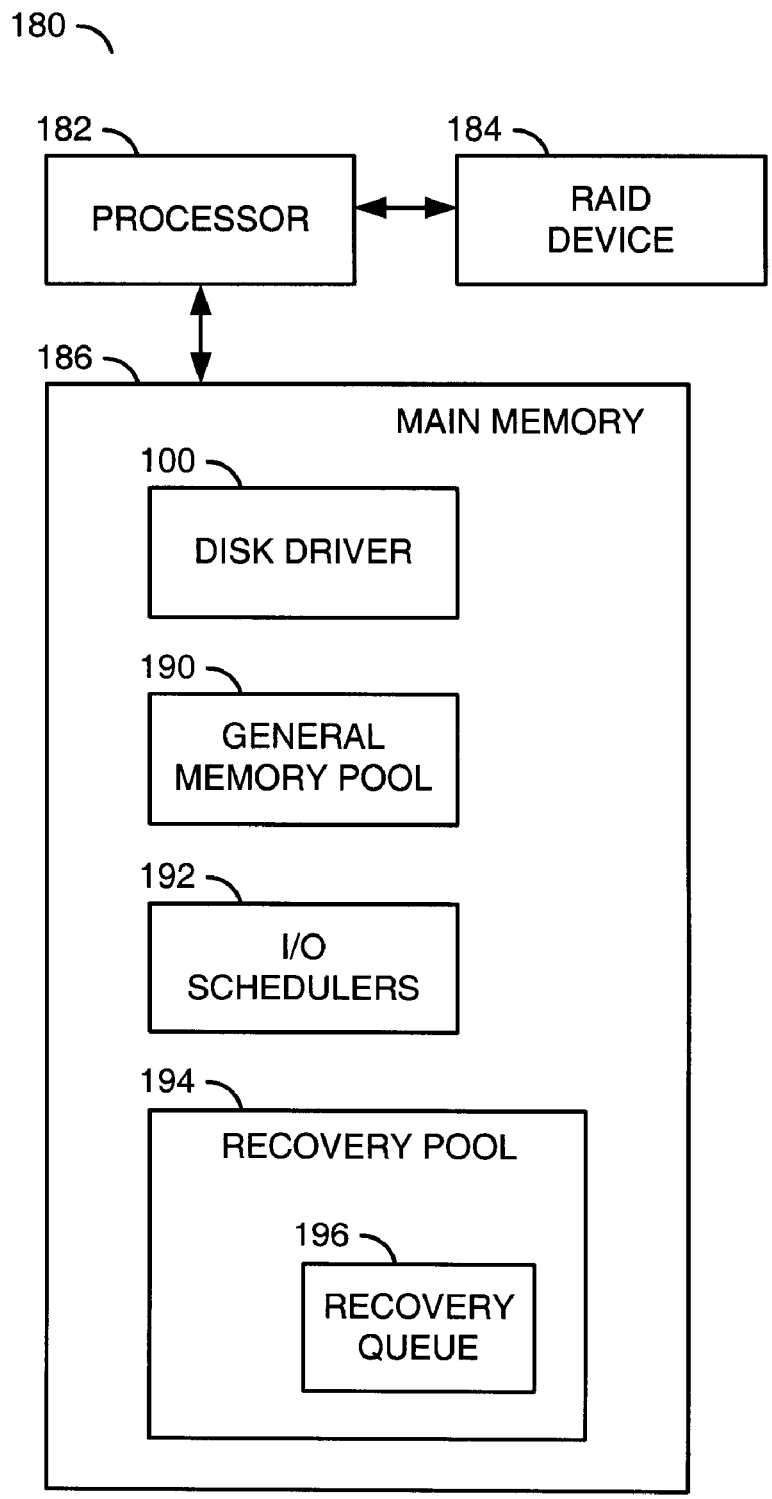
FIG. 8 is a block diagram of an example implementation of an apparatus.

Referring to FIG. 8, a block diagram of an example implementation of an apparatus 180 having the driver 100 is shown. The apparatus 180 generally comprises a circuit 182, a circuit 184 and a circuit 186. The circuits 182 to 186 may represent modules and/or blocks that may be implemented as hardware, firmware, software, a combination of hardware, firmware and/or software, or other implementations.

The circuit 182 may be implemented as a processor. The circuit 182 is generally operational to communicate with the circuit 186, execute the driver 100, execute the input/output schedulers and transfer information to and from the circuit 184. Other software programs may be executed by the circuit 182 to meet the criteria of a particular application.

The circuit 184 may implement a RAID device having multiple memory drives. The circuit 184 may be operational to accept, store and present the information to and from the circuit 182. The circuit 184 may be configured as a RAID 0 device, a RAID 1 device, a RAID 5 device, a RAID 6 device, a RAID 10 device, a RAID 53 device or other RAID configurations. Non-RAID type memory devices may also be implemented to meet the criteria of a particular application.

The circuit 186 may be implemented as a main memory. The circuit 186 generally provides a storage capability to hold at least the driver 100, the general memory pool 190, the input/output schedulers 192, the recovery memory pool 194 and the recovery queue 196. The circuit 186 may be configured as a random access memory to allow for (i) the creation and destruction of the recovery memory pool 194 and (ii) the packets REC_PACKET_T to be added to and removed from the recovery queue 196.

The functions performed by the diagrams of FIGS. 1-8 may be implemented using one or more of a conventional general purpose processor, digital computer, microprocessor, microcontroller, RISC (reduced instruction set computer) processor, CISC (complex instruction set computer) processor, SMID (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products) or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. A method of resource allocation failure recovery comprising steps of:
    (A) generating a plurality of resource requests from a plurality of driver modules to a manager module executed by a processor;
    (B) generating a plurality of calls from said manager module to a plurality of allocation modules in response to said resource requests;
    (C) allocating a plurality of resources to said driver modules using said allocation modules in response to said calls;
    (D) allocating a portion of a memory pool to a recovery packet using said manager module in response to a given one of said allocation modules signaling a failed allocation of a particular one of said resources that failed allocation;
    (E) adding information to said recovery, packet using said manager module, wherein said information identifies said given allocation module and said particular resource; and
    (F) recovering from said failed allocation using said given allocation module in response to said information in said recovery packet.

2. The method according to claim 1, further comprises a step of:
    generating another call from said manager module to said given allocation module to retry said failed 5 allocation.

3. The method according to claim 1, further comprising a step of:
    filling said recovery packet with a one or more parameters corresponding to said particular resource using said manager module, wherein said parameters are received by said manager module from said driver modules.

4. The method according to claim 3, further comprising a step of:
    adding said recovery packet to a queue using said manager module.

5. The method according to claim 4, further comprising a step of:
    detaching said recovery packet from said queue 5 using said manager module when prompted by a scheduler module.

6. The method according to claim 5, further comprising a step of:
    generating another call from said manager module to said given allocation module to retry said failed allocation.

7. The method according to claim 6, further comprising a step of:
    returning said recovery packet to said queue using said manager module in response to said retry failing.

8. The method according to claim 7, further comprising a step of:
    detaching a next recovery packet from said queue before 5 said manager module responds to any new requests from said driver modules.

9. The method according to claim 6, further comprising a step of:
    returning said recovery packet to said memory pool using said manager module in response to a successful allocation of said particular resource.

10. The method according to claim 1, wherein said driver modules, said manager module and said allocation modules form a disk driver of a RAID memory.

11. An apparatus comprising:
    a plurality of driver modules executable by a processor and configured to generate a plurality of resource requests;
    a plurality of allocation modules configured to allocate a plurality of resources to said driver modules in response to a plurality of calls; and
    a manager module configured to (i) generate said calls to said allocation modules in response to said resource requests, (ii) allocate a portion of a memory pool to a recovery packet in response to a given one of said allocation modules signaling a failed allocation of a particular one of said resources and (iii) add information to said recovery packet, wherein (a) said information identifies said given allocation module and said particular resource that failed allocation and (b) said given allocation module is further configured to recover from said failed allocation in response to said information in said recovery packet.

12. The apparatus according to claim 11, wherein said manager module is further configured to generate another call to said given allocation module to retry said failed allocation.

13. The apparatus according to claim 11, wherein said manager module is further configured to fill said recovery packet with one or more parameters corresponding to said particular resource, wherein said parameters are received from said driver modules.

14. The apparatus according to claim 13, wherein said manager module is further configured to add said recovery packet to a queue.

15. The apparatus according to claim 14, wherein said manager module is further configured to detach said recovery packet from said queue using said manager module when prompted by a scheduler module.

16. The apparatus according to claim 15, wherein said manager module is further configured to generate another call to said given allocation module to retry said failed allocation.

17. The apparatus according to claim 16, wherein said manager module is further configured to return said recovery packet to said queue in response to said retry failing.

18. The apparatus according to claim 17, wherein said manager module is further configured to detach a next recovery packet from said queue before responding to any new requests from said driver modules.

19. The apparatus according to claim 16, wherein said manager module is further configured to return said recovery packet to said memory pool in response to a successful allocation of said particular resource.

20. An apparatus comprising:
means for generating a plurality of resource requests;
means for allocating a plurality of resources to said means for generating said resource requests in response to a plurality of calls; and
means for recovery configured to (i) generate said calls to said means for allocating said resources in response to said resource requests, (ii) allocate a portion of a memory pool to a recovery packet in response to a given one of said means for allocating said resources signaling a failed allocation of a particular one of said resources and (iii) add information to said recovery packet, wherein (a) said information identifies said given means for allocating and said particular resource that failed allocation and (b } said given means for allocating is further configured to recover from said failed allocation in response to said information in said recovery packet.

* * * * *